United States Patent [19]

Falero

[11] Patent Number: 4,893,592
[45] Date of Patent: Jan. 16, 1990

[54] COMBUSTION CHAMBER FOR AN INTERNAL COMBUSTION ENGINE

[76] Inventor: Avelino Falero, P.O. Box 2590, Juncos, P.R. 00666

[21] Appl. No.: 268,276

[22] Filed: Nov. 7, 1988

[51] Int. Cl.$^4$ ................................................. F01L 1/28
[52] U.S. Cl. ................................ 123/79 C; 123/193 P; 123/659
[58] Field of Search .............. 123/655 P, 79 C, 193 P, 123/659, 661

[56] References Cited

U.S. PATENT DOCUMENTS

| | | |
|---|---|---|
| 1,791,991 | 5/1929 | Widmann et al. |
| 1,950,911 | 3/1934 | Zahodiakin |
| 2,211,013 | 8/1940 | Hosterman |
| 2,213,202 | 9/1940 | Buchi |
| 2,815,014 | 12/1957 | Adams ............................ 123/193 P |
| 3,450,110 | 6/1969 | Barnett et al. ...................... 123/65 B |
| 3,881,459 | 5/1975 | Gaetcke ............................ 123/79 C |
| 4,009,702 | 3/1977 | Mayer |
| 4,050,420 | 9/1977 | Cataldo |
| 4,389,986 | 6/1983 | Tanasawa ............................ 123/659 |

FOREIGN PATENT DOCUMENTS

| | | |
|---|---|---|
| 608210 | 1/1935 | Fed. Rep. of Germany |
| 2461444 | 7/1976 | Fed. Rep. of Germany |
| 2501518 | 7/1976 | Fed. Rep. of Germany |
| 244974 | 3/1927 | Italy |
| 0113113 | 5/1988 | Japan ............................ 123/193 P |
| 505467 | 6/1939 | United Kingdom |

*Primary Examiner*—David A. Okonsky
*Attorney, Agent, or Firm*—Oliff & Berridge

[57] ABSTRACT

A combustion chamber of an internal combustion engine includes a co-axial valve mechanism with a hemispherically concave exhaust valve disk actuated by a single overhead camshaft. A piston face is provided including an offset shallow bowl for accommodating the spark gap of a spark plug when the piston is at top dead center and at least one groove situated at least partially about the shallow bowl. The co-axial valve mechanism and piston face configuration results in more complete combustion and greater power development.

17 Claims, 2 Drawing Sheets

COMBUSTION CHAMBER FOR AN INTERNAL COMBUSTION ENGINE

BACKGROUND OF THE INVENTION

U.S. Pat. No. 4,009,702 discloses a combustion chamber of penta-roof design, wherein combustion occurs substantially within a main cavity formed with vertical walls within the piston. A series of circular recesses formed in the piston face facilitate intermixing of air with injected fuel and allow gas and air spill over from the main cavity to provide additional combustion during high engine load conditions.

In U.S. Pat. No. 2,213,202, a restricted combustion chamber of an ellipsoidal shape is provided in an internal combustion engine by valve discs of two telescoped valves arranged coaxially with a piston chamber and cylinder of the engine, and an annular projection on the piston face.

SUMMARY OF THE INVENTION

It is an object of the present invention to provide an improved combustion chamber for an internal combustion engine and thereby produce a highly efficient and powerful internal combustion engine. This object is achieved by providing a combustion chamber delimited laterally by the cylindrical walls of a cylinder, delimited at a lower end by a specifically designed piston crown (face) and delimited in part at an upper end by specially designed valve means for allowing the controlled admission of an air-fuel charge into the combustion chamber and subsequent exhaust of combustion gases therefrom. The valve means comprise co-axially aligned exhaust and intake valve mechanisms actuated by camming means mounted on a single overhead cam shaft. The exhaust valve disk is hemispherically concave with respect to the combustion chamber. The piston face includes an offset shallow bowl for accommodating therein the spark gap of a spark plug when the piston is at top dead center, and at least one groove situated at least partially about the shallow bowl.

The combustion chamber of the present invention has the principal advantage of providing very rapid and complete combustion substantially throughout the volume defined between the valve means, the cylinder walls and the piston face. Thus, the invention comprises an extreme open combustion chamber and thereby provides increased power and improved efficiency.

The extreme open combustion chamber reduces problems of auto ignition and detonation. Exhaust emissions of oxides of nitrogen, hydrocarbons and carbon monoxide are lower than with a standard engine. The piston face configuration and co-axial valve arrangement together forming the combustion chamber will give a 95% volumetric efficiency instead of 85–90% associated with a standard hemispherical chamber. A squish effect is realized resulting in a great increase in the turbulence in the combustion chamber thus accelerating the burning rate. The co-axial valve arrangement and port injection contribute to eliminating knock by means of directional turbulence and rotational swirl.

The coaxial valve-single overhead camshaft arrangement of the present invention provides the following additional advantages:

An increased volumetric efficiency is achieved as compared to conventional double overhead camshaft—four valve arrangements, with less weight and simpler operation. A single overhead camshaft can operate more quietly and efficiently than a double overhead camshaft arrangement. Accessibility to a single camshaft is improved and therefore, change of camshafts can be effected with relatively little engine disassembly.

With a Gilmer belt drive, a single overhead camshaft can represent a cost savings over a double camshaft arrangement. Rapid valve opening and closing can be obtained with more accuracy and less mechanical stress as compared with a double camshaft arrangement. A single overhead camshaft can effect reductions in head frictions yet maintain high efficiency. Thus, overal durability and efficiency are improved.

DETAILED DESCRIPTION OF THE PREFERRED EMBODIMENT

Figure 1:
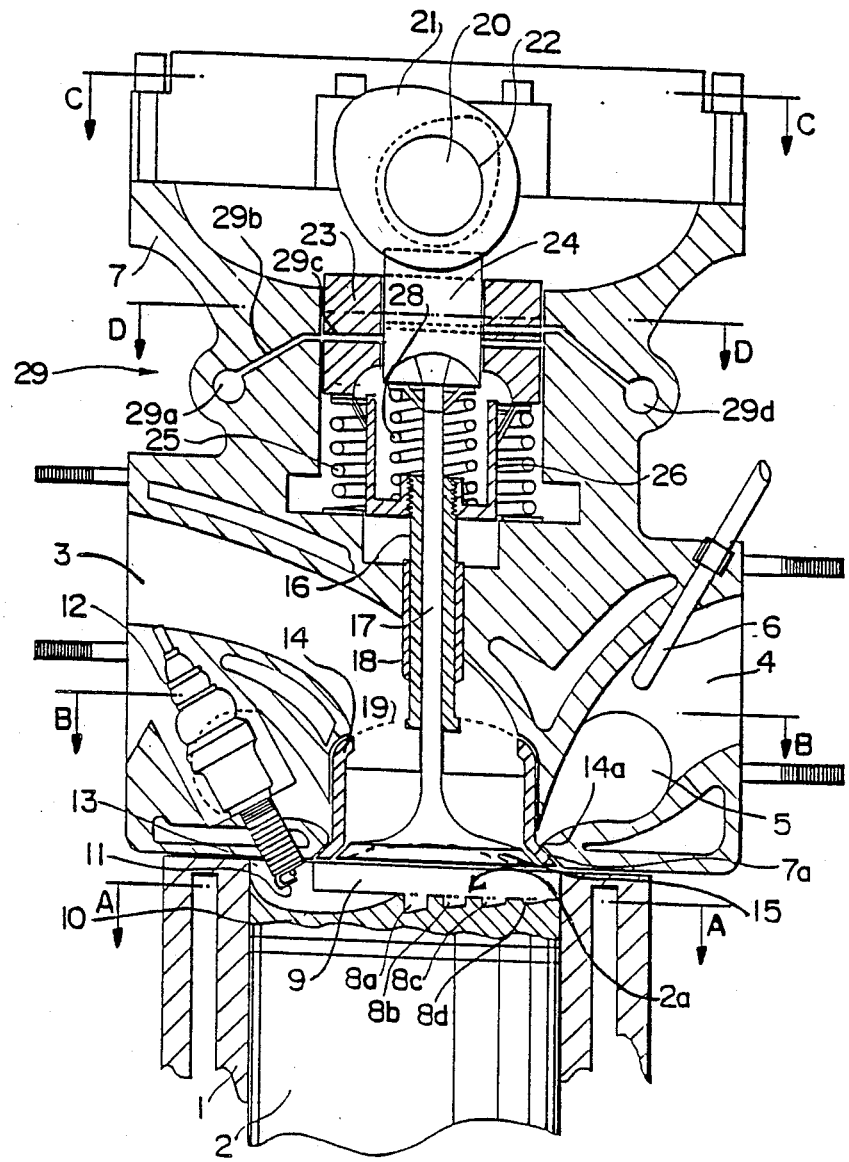
FIG. 1 is a sectional front view of an internal combustion engine according to the present invention.

Referring now to the drawings, FIG. 1 shows an internal combustion engine provided with a cylinder 1 and a piston 2 housed for reciprocating motion therein.

An exhaust port 3 leads to an exhaust manifold (not shown). An air intake port 4 communicates with an annular charge intake port 5 and a fuel injector nozzle 6 protrudes therein to allow a smooth introduction of an air-fuel mix into the charge intake port 5. Fuel injector 6 extends through engine head 7.

Figure 2:
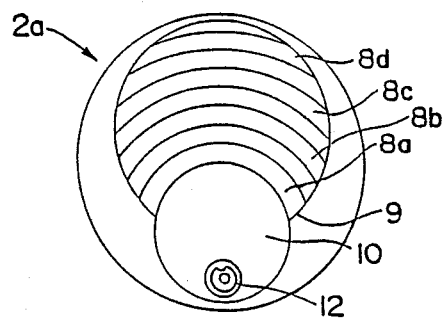
FIG. 2 is a partial cross-sectional view taken along line A—A in FIG. 1 showing the piston face.
Figure 3:
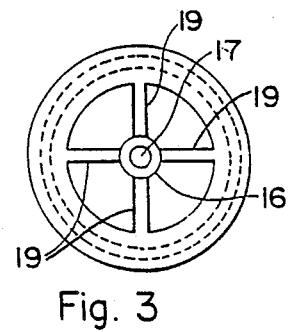
FIG. 3 is a partial cross-sectional view of an intake valve according to the present invention taken on section line B—B in FIG. 1.

As best seen in FIGS. 1 and 2, the piston face 2a is formed with a plurality of substantially concentric arcuate grooves 8a–d contained within an off-set semi-circular depression 9 which abuts with off-set shallow bowl 10 which is preferably accutely concave and opening slightly toward grooves 8a–d. The respective piston face grooves 8a–d are formed with increasing depths. The inner groove 8a is the deepest groove and is adjacent shallow bowl 10.

Shallow bowl 10 accommodates spark gap 11 of plug 12 threaded into the engine head 7 and protruding into the combustion chamber 13 when piston 2 is at top dead center and allows maximum compression (squish) of the charge in combustion chamber 13.

The offset shallow bowl 10 provides a large frontal area to the propogating flame while improving the cooling of combustion gases prior to exhaust. Grooves 8a–d contribute to the creation of turbulence in the fuel-air charge to thereby facilitate very rapid and complete combustion throughout the cylinder volume between piston face 2a and the valve structure, and decreasing head losses.

Referring now to FIGS. 1 and 3–6 a co-axial valve mechanism comprises two telescoped valve disks 14 and 15 which are laterally offset from the longitudinal axis of the cylinder 1 and piston 2. Intake valve disk 14 is bell-shaped and is provided with a flanged portion 14a seatable on seat 7a of engine head 7. Exhaust valve disk 15 is seatable on the inner surface of the flanged portion 14a.

The combustion chamber 13 is delimited in part at its upper end by exhaust valve disk 15 and the flanged portion 14a of intake valve disk 14. Exhaust valve disk 15 is of hemispherically concave shape, thus providing a concave upper delimiting surface of the combustion chamber, which together with the piston face 2a maximizes the fuel burning rate following ignition. The combustion chamber is delimited at its lower end by piston face 2a and laterally by the cylindrical walls of the cylinder 1. The area of piston face 2a outside shallow bowl 10 and semicircular depression 9 (squish area) projects beyond the inlet of charge intake port 5 to promote the surface area-to-volume ratio in the end gas.

The squish is effective to increase the combustion rate during the main portion of the combustion event, i.e., when the piston is at its top dead center position. The combination of swirl and squish increase the burning rate. Swirl and squish complement each other with the present design since swirl is high early in the combustion process and squish reaches its maximum strength later in the process with the piston at top dead center.

The co-axial valve mechanism comprises tubular intake valve stem 16 which surrounds exhaust valve stem 17 and guides the same. The intake valve stem 16 is guided by tubular guide 18 secured in engine head 7 and extending into exhaust port 3. Radial arms 19 interconnect bell-shaped intake valve disk 14 with valve stem 16.

Figure 5:
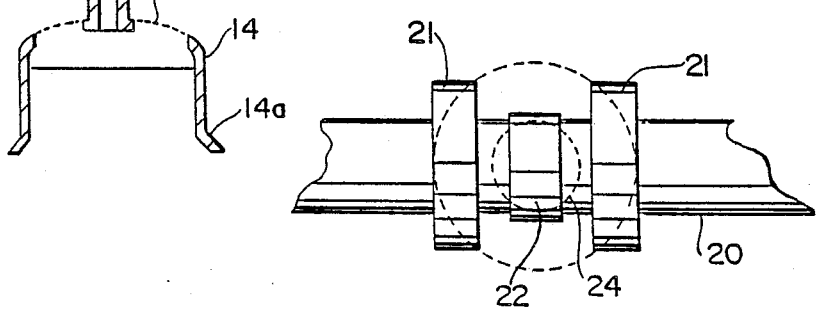
FIG. 5 is a partial cross-sectional view of a camshaft with intake and exhaust valve cam lobes according to the present invention, taken on line C—C in FIG. 1.

Referring now to FIGS. 1 and 5, camshaft 20 is provided with camming means comprising a pair of intake valve cam lobes 21 actuating the intake valve disk 14, and a smaller exhaust valve cam lobe 22 disposed between the two intake valve cam lobes 21 which actuates exhaust valve disk 15. Camshaft 20 is driven in timed relation with the crankshaft of the engine as is known generally in the art.

Motion is transmitted from intake valve cam lobes 21 and exhaust valve cam lobe 22 to respective valve stems 16 and 17 through hydraulic lifter means comprising co-axially arranged annular intake valve lifter 23 and circular exhaust valve lifter 24.

Figure 4:
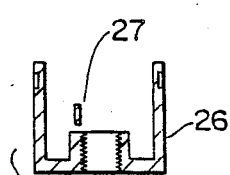
FIG. 4 is a cross-sectional view of an intake valve, according to the present invention, disassembled from its push sleeve.

Intake valve cam lobes 21 ride on the annular intake valve lifter 23 biased against cam lobes 21 by the action of valve spring 25. Upon rotation of the camshaft, cam lobes 21 depress the intake valve lifter 23. Lifter 23 transfers its downward motion to push sleeve 26. The push sleeve 26 in turn transfers its downward motion to intake valve stem 16 connected thereto by means of a lock pin 27 as shown in FIG. 4. Finally, the downward motion of valve stem 16 is transmitted to bell-shaped valve disk 14 taking with it the exhaust valve disk 15 due to the seating arrangement therebetween. Once intake valve disk 14 is depressed, the flanged portion 14a thereof is unseated from the engine head 7 and an air-fuel charge can enter the combustion chamber from annular charge intake port 5.

Intake port 5 is arranged to introduce the fuel charge to the combustion chamber in a path having a downward as well as a radial component with respect to piston face 2a. This facilitates swirl and creates turbulence in conjunction with grooves 8 to thereby improve combustion without high heat losses. Exhaust valve disk 15 is tightly seated against the inner sides of flanged portion 14a of the bell-shaped intake valve disk 14 preventing escape of the charge through the exhaust port 3.

Following intake and subsequent compression and combustion of a charge, exhaust gases are expelled through exhaust port 3 via depression of exhaust valve disk 15 independent of the intake valve disk 14 creating an opening between exhaust valve disk 15 and the inner side of flanged portion 14a of the intake valve disk 14. Exhaust valve disk 15 is depressed by the camming action of exhaust valve cam lobe 22 transmitted through exhaust valve lifter 24 biased against cam lobe 22 by coil spring 28.

Figure 6:
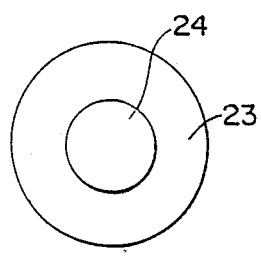
FIG. 6 is a view of a hydraulic tappet according to the present invention taken on line D—D in FIG. 1.

As seen in FIGS. 1 and 6, both intake valve lifter 23 and exhaust valve lifter 24 may be provided with a hydraulic tappet arrangement 29. Hydraulic tappet 29 provides a hydraulic layer buffering the motion transmitted from the camming means to the valve disks. Hydraulic pressure for the tappet arrangement 29 is generated by the crankshaft and delivered from a first oil gallery 29a via a passageway 29b into an annular chamber 29c separating upper and lower portions of the annular intake valve lifter 23. Oil pressure is fed to a chamber formed between upper and lower portions of inner exhaust valve lifter 24 in a similar manner from a second oil gallery 29d.

In the present invention, the extreme open combustion chamber formed by the co-axial valve arrangement including a hemispherically concave exhaust valve disc, and a piston face configuration including an offset shallow bowl and surrounding grooves provides particularly efficient combustion. Initial rapid burning of the charge in the shallow bowl is followed by fuel being burned in the adjacent grooves and throughout the combustion chamber.

The co-axial valve arrangement provide larger charges intake and exhaust areas as compared with conventional designs. The annular intake valve provides a high volumetric flow of air enabling rapid induction not obtainable with conventional designs. The larger exhaust valve openings provide very efficient scavenging of the chamber. As a result, auto ignition and detonation by the use of a lean air-fuel ratio is avoided and more efficient combustion is achieved.

The present invention has been described in detail, including preferred embodiments thereof. It will be appreciated however that those skilled in the art may, upon consideration of the present disclosure, make certain modifications and variations within the scope and spirit of this invention as set forth in the appended claims.

What is claimed is:

1. In an internal combustion engine, an arrangement for providing controlled combustion in a combustion chamber thereof, comprising:
   a cylinder and piston guided in said cylinder;
   a combustion chamber delimited laterally by the cylindrical walls of said cylinder, delimited at a lower end by a face of said piston and delimited in part at an upper end by valve means for allowing the controlled admission of an air-fuel charge into said combustion chamber and subsequent exhaust of combustion gases therefrom,
   said valve means comprising co-axially aligned exhaust and intake valve mechanisms actuated by camming means,
   said piston face comprising a shallow bowl for accommodating therein the spark gap of a spark plug when the piston is at top dead center, and a plurality of arcuately shaped grooves situated at least partially about said shallow bowl.

2. An arrangement as recited in claim 1, wherein said valve means further comprises a co-axially arranged hydraulic lifter assembly for transmitting motion from said camming means to said valve mechanisms, said hydraulic lifter assembly comprising at least one hydraulic layer for buffering the motion transmitted by said camming means to said valve mechanisms.

3. An arrangement according to claim 1, wherein said valve mechanisms are offset from the longitudinal axis of the piston.

4. An arrangement as recited in claim 1, wherein said piston face has four of said grooves substantially concentrically arranged, the relative depths of the grooves decreasing from the inner most groove to the outermost groove.

5. An arrangement as recited in claim 1, wherein said plurality of grooves are situated within a semi-circular recess in the piston face which abuts with said shallow bowl.

6. An arrangement as recited in claim 4, wherein the bottom surface of each of said grooves is inclined toward said shallow bowl with respect to said piston face.

7. An arrangement as recited in claim 1, wherein said shallow bowl is offset from the longitudinal axis of said piston.

8. An arrangement as recited in claim 1, wherein said valve means comprises a telescoped arrangement of intake and exhaust valve stems, the outer of said telescoped stems comprising a sleeve having a bell-shaped valve disc at a lower end thereof and the inner of said valve stems having at a lower end a circular valve disc movable into and out of said bell-shaped valve disc and seatable therein, said bell-shaped valve disc being seatable on a valve seat formed in a head of the engine.

9. An arrangement as recited in claim 1, further comprising a fuel injector nozzle located within an air intake port of the engine head.

10. An arrangement as recited in claim 1, wherein a charge injection port is oriented to direct a charge into said combustion chamber in a direction with both a radial and axial component with respect to said piston.

11. An arrangement as recited in claim 1, wherein said camming means are mounted on a single overhead camshaft.

12. An arrangement as recited in claim 2, wherein said hydraulic lifter assembly comprises two hydraulic layers which communicate through respective passages to respective oil galleries.

13. An arrangement according to claim 1, wherein the inner of said coaxially aligned valve mechanisms comprises a circular hemispherically concave valve disk delimiting in part the upper end of said combustion chamber.

14. An arrangement according to claim 13, wherein said inner coaxially aligned valve mechanism is the exhaust valve.

15. An arrangement according to claim 1, wherein said shallow bowl opens slightly toward said at least one groove.

16. An arrangement according to claim 5, wherein a squish area of said piston face outside said semicircular recess and said shallow bowl extends radially of the piston face beyond the opening of said intake valve mechanism.

17. An arrangement according to claim 8, wherein said circular valve disk is hemispherically concave with respect to the combustion chamber.

* * * * *